United States Patent [19]

Kimura et al.

[11] 3,839,601

[45] Oct. 1, 1974

[54] OPTICAL RECORD SHEET AND DEVICE FOR REPRODUCING SOUND THEREFROM

[75] Inventors: Yoshinobu Kimura; Takeo Tsuchihashi, both of Tokyo, Japan

[73] Assignee: Gakken Co., Ltd., Tokyo, Japan

[22] Filed: June 30, 1972

[21] Appl. No.: 267,992

[52] U.S. Cl. .......................... 179/100.3 V, 178/6.7
[51] Int. Cl. .......................................... G11b 7/02
[58] Field of Search................ 179/100.3 V; 178/6.7

[56] References Cited

UNITED STATES PATENTS

| | | | |
|---|---|---|---|
| 1,877,447 | 9/1932 | Friebus | 179/100.3 V |
| 1,967,882 | 7/1934 | Hammond | 179/100.3 V |
| 2,422,398 | 6/1947 | Dilks | 179/100.3 V |
| 3,337,718 | 8/1967 | Harper et al. | 179/100.3 V |
| 3,363,054 | 1/1968 | Mason | 179/100.3 V |
| 3,366,733 | 1/1968 | Frohbach | 179/100.3 V |
| 3,371,156 | 2/1968 | Frohbach et al. | 179/100.3 V |
| 3,381,086 | 4/1968 | Moss et al. | 179/100.3 V |
| 3,654,401 | 4/1972 | Dickopp et al. | 179/100.3 V X |

*Primary Examiner*—Paul J. Henon
*Assistant Examiner*—Mark Edward Nusbaum
*Attorney, Agent, or Firm*—Irving M. Weiner

[57] ABSTRACT

An optical sound track is formed in multiturn spiral arrangement on one surface of an opaque sheet-like medium. On the opposite surface some information relating to the sound intelligence recorded on the other surface may be visually represented. For reproduction, the record sheet is placed on an optical sound reproducer with its sound track in face-to-face registered relationship with a turntable on the top surface of the reproducer. A photoelectric reproducing head positioned below a radial slot of the turntable is made to follow the spiral path of the sound track by the resultant of its own linear motion along the slot and the rotation of the turntable relative to the record sheet.

15 Claims, 17 Drawing Figures

OPTICAL RECORD SHEET AND DEVICE FOR REPRODUCING SOUND THEREFROM

This invention relates generally to audiovisual equipment. More specifically, the invention is directed to an optical record unit having a sound track formed on one surface of a sheet-like medium, the other surface of which has some pertinent information visually represented thereon and/or is made suitable for writing upon, and to an optical sound reproducer for particular use with the optical record unit.

BACKGROUND OF THE INVENTION

The only prior art comparable to the optical record unit of this invention is a magnetic record sheet having a magnetic sound track formed on one of its surfaces and some visual information printed or otherwise represented on the opposite surface. However, this record sheet has a number of disadvantages which are inevitable consequences of magnetic recording. For example, since the magnetic record sheet is kept in constant sliding contact with the reproducing head during sound reproduction, both the sheet and the reproducing head are subject to frictional losses and wear. Furthermore, the sound reproduction from magnetic record sheets is easily affected by external magnetic fields, and deterioration in the quality of the sound reproduced is almost unavoidable with the lapse of time. It is an added disadvantage that magnetic record sheets are expensive, not suitable for mass production, and inferior in recording characteristics as compared to magnetic tape.

SUMMARY OF THE INVENTION

The present invention provides an optical record unit which includes a sheet-like medium and an optical sound track formed on one surface of the sheet-like medium.

The present invention also provides a device for reproducing sound intelligence stored in an optical sound track formed in multiturn spiral arrangement on one surface of a sheet-like record medium. The device includes a casing and a turntable on the top surface of the casing on which the sheet-like record medium is to be placed with its optical sound track in register with the turntable. The turntable is provided with a slot extending radially therethrough. The device also includes means for rotating the turntable relative to the sheet-like medium and a photoelectric reproducing head mounted below the turntable for scanning the optical sound track through the slot. The photoelectric reproducing head is rotatable with the turntable. The device also includes feed means for linearly moving the photoelectric reproducing head along the slot in relationship with the rotation of the turntable, whereby the photoelectric reproducing head is made capable of following the spiral path of the optical sound track due to the resultant of its own linear motion and the rotation of the turntable.

The present invention also provides a photoelectric reproducing head including a hollow cylindrical housing, and a light source adjacent one of the ends of the housing. The photoelectric reproducing head also includes a lens system within the housing for converging the light radiated by the light source. The reproducing head also includes at least one photoelectric element disposed adjacent the other end of the housing.

It is an object of the present invention to provide a novel optical record unit having an optical sound track formed on one surface of a sheet-like medium, the other surface of which has some pertinent information visually represented thereon and/or is made suitable for writing upon.

The invention provides an optical record unit particularly suitable for use as an audiovisual aid for self-teaching purposes, among other applications. For instance, a series of questions or problems may be visually presented on one surface of the optical record unit, with or without illustrations and/or blanks to fill in the answers. The sound intelligence optically recorded on the opposite surface will instruct the user how to solve the questions or problems.

The invention also provides an optical record unit which can be made of paper, opaque film, or many other similar sheet-like media, which is less expensive and more durable than magnetic record sheets, and which can be easily mass produced.

While the sound track on the optical record unit of this invention may be arranged linearly, arcuately, or in any other desired pattern. It must also be taken into account that the true utility of any recording medium is determined only in relation with the means for sound reproduction therefrom. Accordingly, in view of the simplicity of the mechanisms necessary for causing a photoelectric reproducing head or scanner to follow a predetermined path of the sound track, the present invention provides an optical record unit in which the sound track is arranged in multiturn spiral arrangement.

This invention provides a novel device for reproducing sound stored in an optical sound track arranged in multiturn spiral arrangement on a sheet-like medium.

A further object of the invention is to provide a sound reproducing device of the character referred to, including a photoelectric reproducing head which is positioned below a radial slot of a turntable for rotation therewith and which is linearly movable along the slot. By the resultant of these rotary and linear motions, the reproducing head is capable of accurately following the multiturn spiral path of the sound track fixedly placed in face-to-face relationship upon the turntable.

The invention provides a sound reproducing device of the character referred to, in which means are provided for automatically returning the photoelectric reproducing head to its starting position when the head has travelled to the terminal position after scanning the complete sound track arranged as aforesaid.

A further object of the invention is to provide a sound reproducing device of the above-described character, in which the linear movement of the photoelectric reproducing head and the automatic return thereof use the rotation of the turntable, without need for any other power source.

The invention provides a sound reproducing device of the above-described character, such that an optical record unit for use therewith is held stationary during sound reproduction, so that visual information which may be given on the upper surface of the record unit can be observed while the sound is being reproduced from the lower surface thereof.

It is also an object of this invention to provide a novel photoelectric reproducing head designed primarily for use in the above-described sound reproducing device, within which the following are substantially integrally combined: the means for producing a beam of light and a photoelectric element adapted for translating variations in the light reflected from the sound track into corresponding variations in electrical energy. This is in contrast to the prior art in which the said means and the photoelectric element have been provided independently.

The invention provides a photoelectric reproducing head of the class described, which can be positioned extremely close to the optical sound track for scanning the same with an intense beam of light and from which the light beam is emitted substantially perpendicular to the plane of the sound track, so that high fidelity sound reproduction is ensured.

DETAILED DESCRIPTION

Figure 1:
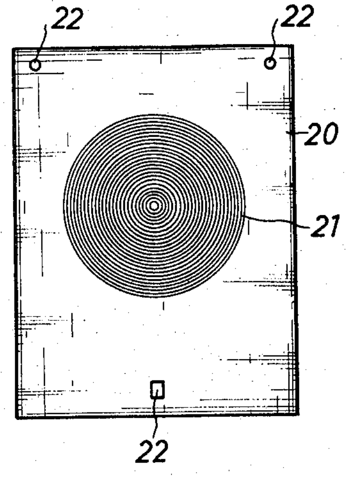
FIG. 1 is a plane view of an optical record unit according to this invention, in which is shown an optical sound track in multiturn spiral arrangement.

Referring first to FIG. 1 of the drawings, the optical record unit of this invention may be comprised of a sheet 20 of opaque material such as, for example, paper or film. There are no particular limitations as to the shape of the sheet 20, and the rectangular shape illustrated in this drawing is purely by way of example. An optical sound track 21 on one surface of the sheet 20 may be formed by printing, by photographic development, or by any other suitable process, depending primarily upon the material of the sheet. Further, the optical sound track 21 may consist of either density or width variations to represent sound intelligence.

Figure 2:
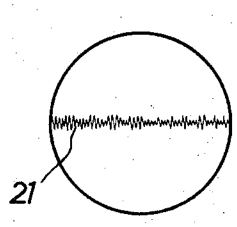
FIG. 2 is an explanatory view showing the optical sound track of FIG. 1 on an enlarged scale.

FIG. 2 illustrates on an enlarged scale the latter type of optical sound track as employed in this embodiment of the invention. Although this optical sound track 21 may be arranged either linearly, arcuately, or in any other desired pattern, a multiturn spiral arrangement like the groove of a phonograph record is here employed to facilitate sound reproduction therefrom, as hereinafter described in greater detail.

It has been confirmed by this applicant that sound intelligence is reproducible for at least 4 minutes with excellent fidelity by scanning at the rate of 8 to 9 centimeters per second. Such a spiral sound track is printed on a letter-sized sheet of paper in the form of width variations, with a maximum width of 0.5 millimeters.

Preferably, information relating to the sound intelligence recorded on the one surface of the sheet 20 may be printed or otherwise presented on the other or, in this case, front surface thereof. For example, a series of questions or problems for school-age children, with or without blanks to fill in the answers, may be provided on the front surface of the sheet 20. The sound track on the opposite surface of the sheet may contain the answers, perhaps together with some appropriate explanations or discussions. In this manner the optical record unit is suitable for self-teaching purposes. The unit can also be used for language study by visually and audibly reproducing and presenting identical subject matter on both surfaces of the sheet. To give still another example, pictures, photographs or similar representations may be provided on the front surface of the sheet by way of illustration of vocal instructions or the like obtainable from the opposite surface.

A plurality (three in this embodiment) of bores 22 are formed through the sheet 20 in order to place the same neatly in position on an optical sound reproducer hereinafter described. The lowermost bore 22 as seen in FIG. 1 is rectangular in shape to immovably retain the sheet in place.

Figure 3:
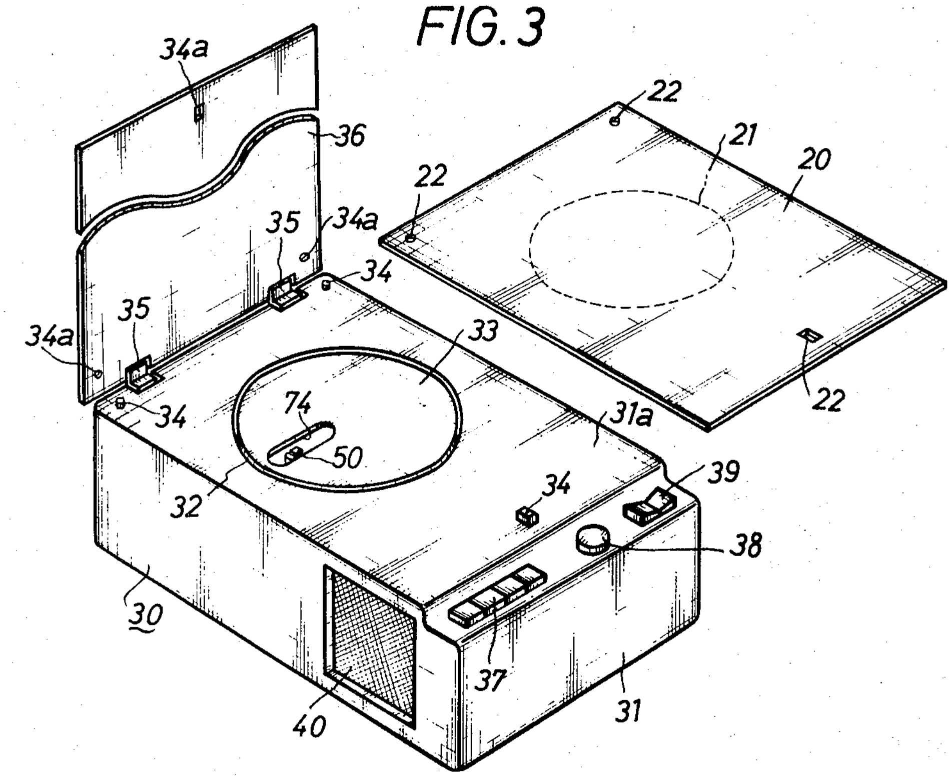
FIG. 3 is a perspective view showing an optical sound reproducer constructed according to this invention, in combination with the optical record unit of FIG. 1.

As illustrated in FIG. 3, the optical sound reproducer 30 includes a casing 31 which is conveniently molded from plastic or like material. The shape and size of the top surface 31*a* of this casing 31 are determined in substantial agreement with the shape and size of the above-described optical record unit. A relatively large circular aperture 32 is formed approximately in the center of the top surface 31*a*, and a turntable 33 is received therein with suitable clearance. The position of this turntable on the top surface 31*a* corresponds to the position of the sound track 21 on the sheet 20. A plurality of pins 34 are formed on the top surface 31*a* to fit into the bores 22 of the sheet 20 when the same is placed on the optical sound reproducer for reproduction of the intelligence recorded in its sound track 21.

A flat, transparent sheet-retaining cover 36 is hinged at 35 to one edge of the casing top surface 31*a*, the sheet-retaining cover being likewise shaped and sized to suit the shape and size of the sheet 20. A plurality of bores 34*a* are formed through this sheet-retaining cover 36 to receive the pins 34 via the sheet 20. In this manner the sheet 20 placed on the sound reproducer 30, with its sound track 21 in face-to-face register with the turntable 33, is securely retained in position by the pins 34 and the overlying sheet-retaining cover 36.

The optical sound reproducer 30 is further equipped with a plurality of operational switches 37, a volume control dial 38, and an on-off switch 39. The operational switches 37 may be provided in accordance with those accompanying the conventional tape reproducer, typically including a playback or reproducion switch, stop switch, fast forward switch, and fast return (rewind) switch. A speaker 40 is electrically connected via the known amplifier system to a photoelectric reproducing head or scanner hereinafter described in detail.

Figure 4:
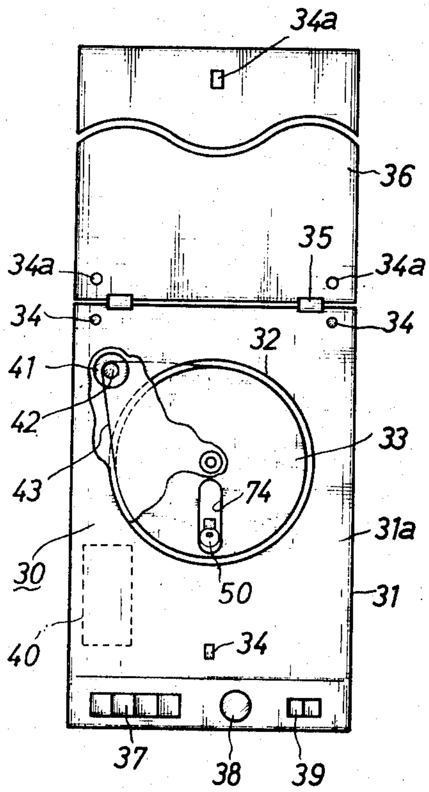
FIG. 4 is a partly-broken away top plan view of the optical sound reproducer of FIG. 3.

As best shown in FIG. 4, the turntable 33 is driven by a belt 43 extending between its peripheral groove (not shown) and a pulley 42 mounted on the output shaft of a motor 41. Other types of drive known in the art are employable as well. The photoelectric reproducing head 50 is moved in association with the rotation of the turntable 33 to follow the spiral path of the sound track 21, while emitting a beam of light to scan the sound track and to receive the reflected light on its photoelectric element yet to be described. The variations in the reflected light are then translated into corresponding variations in electrical energy. After being amplified, the thus obtained electrical signal is reproduced as sound from the speaker 40. The aforesaid switches 37 may be selectively operated during this process of sound reproduction in order to take full advantage of the intelligence recorded in the optical record unit.

Figure 5:
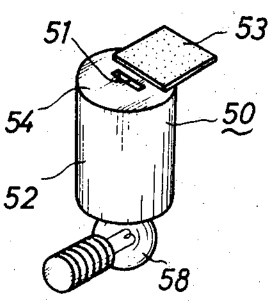
FIG. 5 is a perspective view of a photoelectric reproducing head constructed according to this invention.

FIGS. 5 through 8 illustrate various types of the photoelectric reproducing head 50 adapted for use with the optical sound reproducer of this invention. Essentially, the photoelectric reproducing head comprises means for producing a beam of light, and a photoelectric element, such as a photocell, for translating variations in the reflected light into corresponding variations in an electrical signal. Illustrated in FIG. 5 is a type of head on which an inclined planar photocell 53 is mounted, with its light-sensitive surface directed upward, on the closed upper end 54 of a hollow cylinder 52. This hollow cylinder houses a condenser lens, not shown, and is slitted or otherwise apertured at 51 to permit the emission of a light beam therethrough.

Figure 7:
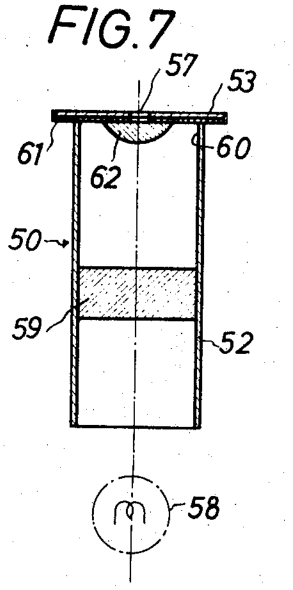
FIG. 7 is an explanatory, axial sectional view of still another example of a photoelectric reproducing head of this invention.
Figure 6:
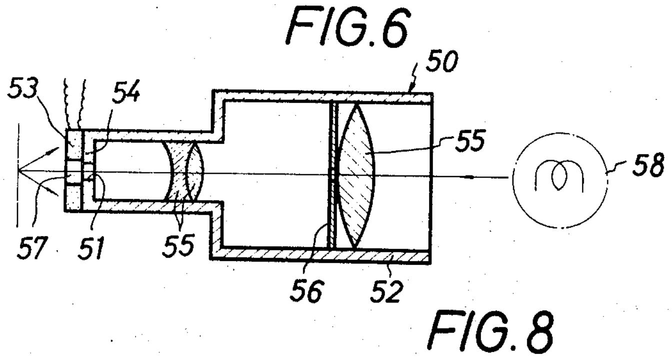
FIG. 6 is an explanatory, axial sectional view of another example of a photoelectric reproducing head of this invention.

The photocell 53 is mounted horizontally in both types of photoelectric reproducing head shown in FIGS. 6 and 7. Referring first to FIG. 6, a hollow cylinder 52, closed at its upper end 54, includes an upper portion of comparatively small diameter and a lower portion of larger diameter. The small diameter portion houses a condenser lens 55, while the large diameter portion houses another condenser lens 55 of correspondingly large diameter and an apertured plate 56. The closed upper end 54 of the cylinder 52, and a planar photocell 53 affixed thereto with its light-sensitive surface directed upward, are slitted or otherwise apertured at 51 and 57, respectively, to permit the emission of the light beam produced by converging the light radiated by a light source such as an electric lamp 58. The light beam is then variously reflected from the sound track 21 on the optical record unit to the photocell 53 which is electrically connected via the amplifier system to the speaker 40 as aforesaid.

In the type of photoelectric reproducing head shown in FIG. 7, a planar photocell 53 apertured at 57 and coated with an insulating layer 61 is directly affixed to the open upper end 60 of a hollow cylinder 52. A first cylindrical lens 59 is mounted in approximately the mid-part of the cylinder with its curved surface directed downward. A second cylindrical lens 62, also with its curved surface directed downward, is attached to the insulating layer 61 of the photocell 53 so as to be in alignment with the aperture 57. It will be noted that these first and second cylindrical lenses 59 and 62 extend at right angles with each other. Hence, the light radiated by the lamp 58 is efficiently converged by these cylindrical lenses, and emits through the aperture 57 in the form of a beam.

Figure 8:
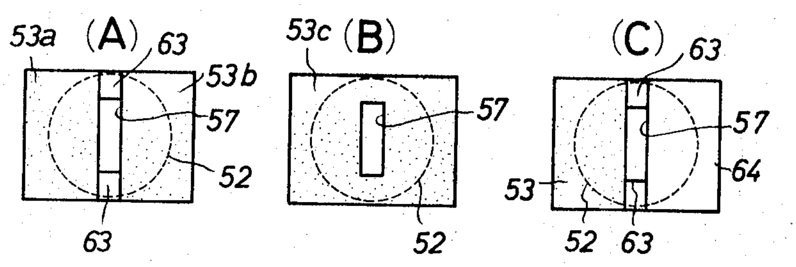
FIGS. 8(A), (B) and (C) are top plan views of further examples of photoelectric reproducing heads of this invention.

FIG. 8 discloses three different arrangements of the photocell 53 and the aperture 57 on the top of the hollow cylinder 52 which form part of the photoelectric reproducing head shown in FIG. 7. In FIG. 8(A) the aperture 57 is defined between a pair of spaced-apart photocells 53*a* and 53*b*, and both ends of the aperture 57 is centrally located on a single photocell 53*c*. FIG. 8(C) illustrates a further arrangement in which one of the two photocells shown in FIG. 8(A) is replaced by a shielding plate or screen 64.

According to this invention all the above described types of photoelectric reproducing heads the photoelectric element or photocell is substantially integrally combined with the means for producing a beam of light, so that the reproducing heads are substantially reduced in size and simplified in construction. Moreover, since the substantially integral photoelectric element receives the light reflected from the sound track 21, the losses and distortion of the reflected light are minimized.

Figure 9:
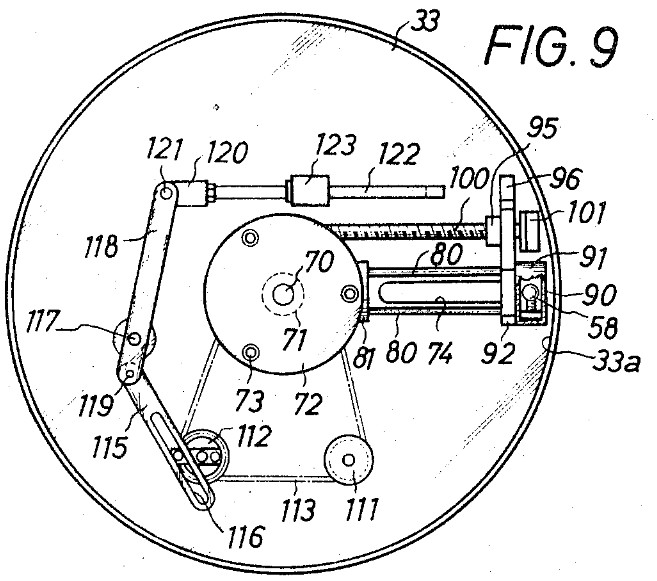
FIG. 9 is a bottom plan view of a turntable and its associated mechanisms in the optical sound reproducer of FIG. 3.

FIGS. 9 through 17 illustrate the various means for moving the photoelectric reproducing head 50 along the spiral path of the optical sound track 21. With reference to FIG. 9 which shows the bottom of the turntable 33 together with its associated parts, a shaft 70 extends vertically downward from the center of the turntable and is rotatably received in a sleeve 71 having a substantially integral disk-shaped support or base 72 at its lower end. This support has a plurality of tapped holes 73 and is fixedly mounted on the bottom of the casing 31 by means of screws or like fasteners. A slot 74 extends radially of the turntable 33 to permit linear motion of the reproducing head 50 therealong (see also FIGS. 3 and 4). A pair of parallel guide rods 80 extend on both sides of the slot 74, between a skirt 33*a* of the turntable 33 and a stop 81 secured to the bottom surface of the turntable.

Figure 12:
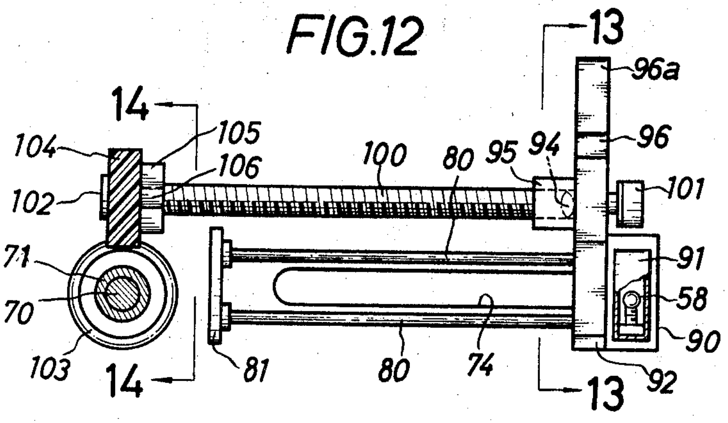
FIG. 12 is also a view similar to FIG. 9, explanatory of the means for linear movement of the photoelectric reproducing head.

A carriage 90, supporting the reproducing head 50 thereon, is slidably mounted on the guide rods 80 to move the reproducing head along the slot 74. A lamp housing 91, containing the electric lamp 58, is attached to the bottom of the carriage 90. The carriage is suitably hollowed or apertured to permit the passage of light radiated by the lamp 58 through the reproducing head 50. A helically grooved feed rod 100 extends parallel to the guide rods 80, both ends of this feed rod being rotatably supported by bearing members 101 and 102, FIG. 10, which are attached to the bottom surface of the turntable. A helical gear 103, FIG. 12, is fixedly mounted on the aforesaid sleeve 71, while a corresponding helical gear 104 is likewise fixedly mounted on the inner end of the feed rod 100. These helical gears 103 and 104 are intermeshed at right angles with each other. By the rotation of the belt-driven turntable 33, therefore, the helical gear 104 revolves around the helical gear 103 while itself rotating on its own axis. In this manner the feed rod 100 is rotated in step with the rotation of the turntable 33.

Figure 10:
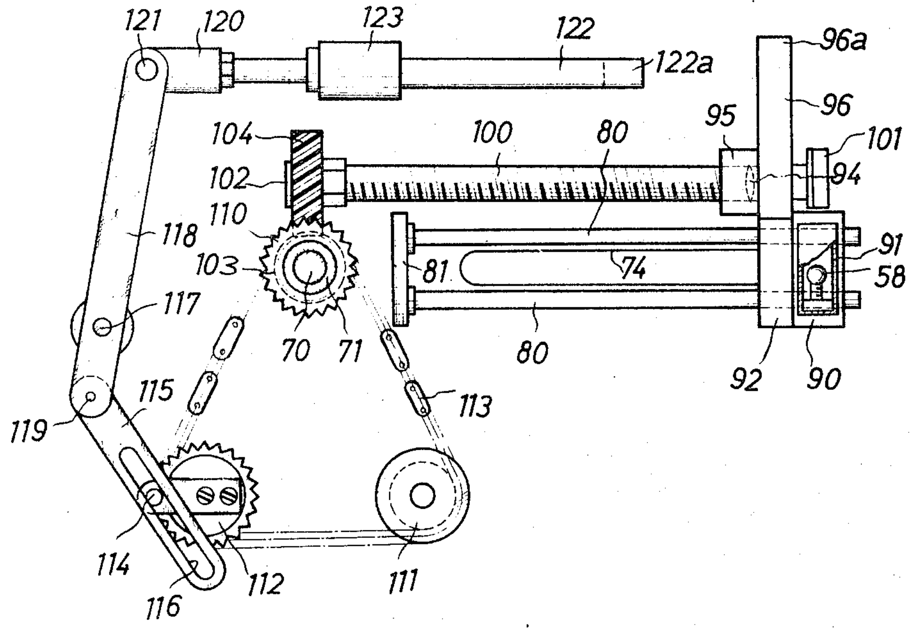
FIG. 10 is a view similar to FIG. 9 with its disk-shaped support removed to show other parts in detail.
Figure 13:
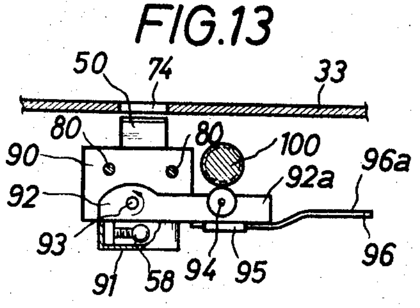
FIG. 13 is a fragmentary vertical sectional view taken along the plane of line 13—13 in FIG. 12.
Figure 14:
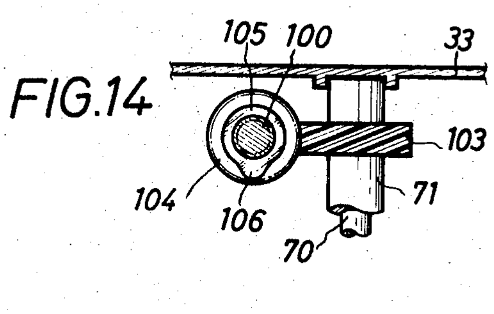
FIG. 14 is a fragmentary vertical sectional view taken along the plane of line 14—14 in FIG. 12.

As best shown in FIGS. 10, 12 and 13, an arm 92 is pinned at 93 to the carriage 90. The end 92*a* of this arm extends below the feed rod 100 and is resiliently urged toward the same by a spring, not shown, as indicated by the arrow in FIG. 13. Attached to this end 92*a* of the arm is a disk-shaped member 94 having a thickness just about enough to be slidably received in the spiral groove formed on the feed rod 100.

A contact member 95 extends inwardly from the end 92*a* of the arm 92 below the disk-like member 94. A cam wheel 105 having a peripheral projection 106 is mounted on the feed rod 100 side by side with the helical gear 104. Further, at the bottom of the arm 92 there is secured a return plate 96 having its end 96*a* extending past the feed rod 100. This return plate 96 is slightly bent upwardly to clear the path of a return rod 122 which moves back and forth as hereinafter described in greater detail.

Figure 11:
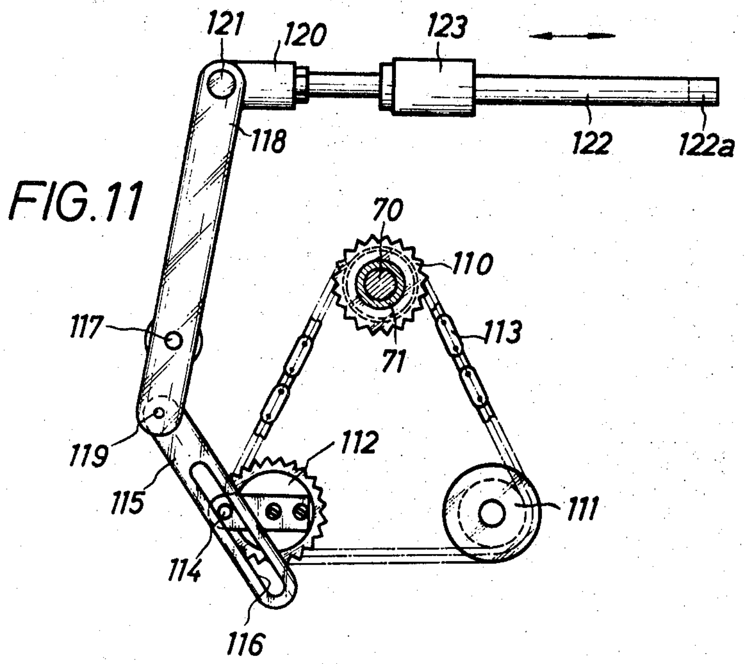
FIG. 11 is a view similar to FIG. 9, explanatory of the means for automatic return of the photoelectric reproducing head to its starting position.

As seen in FIGS. 10 and 11, a first sprocket wheel 110 is mounted on the sleeve 71 below the helical gear 103 which also is mounted thereon as previously mentioned. This first sprocket wheel is linked with a roller 111 and a second sprocket wheel 112 by a chain 113, the roller and second sprocket wheel being rotatably mounted on their respective shafts which are affixed to the bottom surface of the turntable 33. Thus, with the roation of the turntable, the roller 111 and the second sprocket wheel 112 revolve around the first sprocket wheel 110, while themselves rotating on their own axes.

Figure 17:
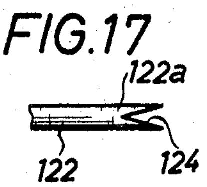
FIG. 17 is an enlarged, fragmentary side view of the forward end of a return rod.

A crankpin 114 projecting from the web rotatable in one piece with the second sprocket wheel 112 is operatively received in a slot 116 extending longitudinally of a lever 115. One end of this lever 115 is pinned at 119 to one end of a rod 118 oscillatable on a pivot 117. The other end of the oscillatable rod 118 is pinned at 121 to a link 120 which is coupled to the aforesaid return rod 122 extending through a support member 123 with suitable clearance. The end 122*a* of this return rod is bifurcated to form a holding portion 124, as shown in FIG. 17.

Proceeding to the description of operation of the mechanisms hereinbefore described with reference to FIGS. 9 through 17, the helical gear 104 both revolves around the helical hear 103 and on its own axis when the turntable 33 is roated in the manner mentioned already. The second sprocket wheel 112, linked to the first sprocket wheel 110 by the chain 113, likewise revolves on its own axis with the rotation of the turntable 33. The spirally grooved feed rod 100 is rotated with the helical gear 104, so that the disk-like member 94 received in its spiral groove moves the carriage 90 together with the photoelectric reproducing head 50 mounted thereon. Guided by the rods 80, the carriage 90 travels along the slot 74 at a speed predetermined in relation with the revolving speed of the turntable 33.

Thus, the photoelectric reproducing head 50 moves from its outmost position inwardly along the slot 74. Because the turntable 33 is in rotation, the reproducing head is caused to move in a spiral course by the resultant of these linear and rotary motions. The pitch of the spiral groove formed on the feed rod 100 must be determined in relation with the pitch of the spiral sound track 21 on the optical record unit. By placing the sheet 20 in position on the sound reproducer 30, with its sound track 21 in register with the turntable 33, and by revolving the turntable at a proper constant speed, the reproducing head 50 follows the spiral path of the sound track. The intelligence stored in the thus-scanned sound track 21 is then photoelectrically translated into audible sound in the manner previously described.

Figure 15:
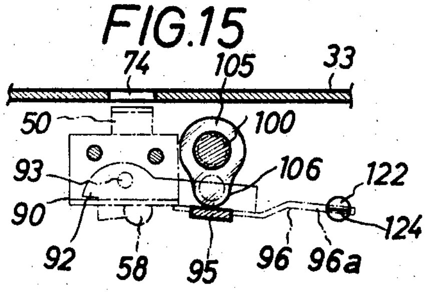
FIG. 15 is a fragmentary vertical sectional view explanatory of the automatic return of the photoelectric reproducing head.
Figure 16:
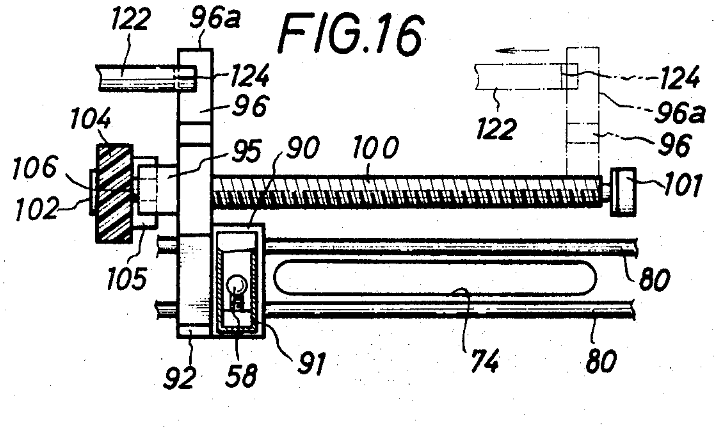
FIG. 16 is a fragmentary bottom plan view also explanatory of the automatic return of the photoelectric reproducing head.

When the carriage 90 together with the photoelectric reproducing head 50 consequently reach their innermost terminal position on the feed rod 100, as shown in FIG. 16, the contact member 95 extending from the arm 92 comes into contact with the peripheral projection 106 of the cam wheel 105 and is thereby depressed. As illustrated in FIG. 15, the arm 92 is turned downwardly on its pin 93 against the force of the spring not shown in the drawings, so that the disk-like member 94 is now disengaged from the feed rod.

As above described, the second sprocket wheel 112 with its crank pin 114 also rotates with the rotation of the turntable 33. Resultantly, the rod 118 is oscillated on the pivot 117 by the lever 115 which receives the crankpin 114 in its longitudinally extending slot 116. By the oscillatory motion of the rod 118, the return rod 122 coupled thereto via the link 120 linearly moves back and forth through a predetermined stroke, as indicated by the arrow in FIG. 11. It is important that this return rod be so positioned that its end 122*a* engages the end 96*a* of the return plate 96 when the contact member 95 is depressed by the cam wheel 105 as described in the preceding paragraph.

As seen in FIG. 16, the end 96*a* of the depressed return plate 96 is arrested by the holding portion 124, FIG. 17, of the return rod 122 when this rod starts advancing from its fully retracted position. Since then the disk-like member 94 is disengaged from the feed rod 100, the carriage 90 is pushed back to its outmost starting position by the return rod 122 along the guide rods 80, and only the return rod 122 consequently moves back to its retracted position. The arm 92 is now urged by the spring toward the feed rod 100 to move the disk-like member into engagement with its spiral groove.

Although the return plate 96 may be depressed in the innermost terminal position of the carriage 90 when the return rod 122 is not fully retracted, the return rod continues traveling toward its retracted position in sliding contact with the lower surface of the return plate. Only when the return rod is fully retracted, will the return plate move out of contact therewith and attain its predetermined position for proper engagement with the holding portion 124 of the return rod. It is therefore desirable that the return plate 96 be made of suitably resilient material. In this manner the photoelectric reproducing head 50 automatically returns from its innermost terminal position to the outermost starting position, thereby making itself ready for the ensuing sound reproducing operation.

It will be understood that the preferred embodiments of the invention herein disclosed are by way of example and explanation only, and are subject to many modifications, substitutions, and changes without departing from the proper scope of fair meaning of the invention defined by the appended claims. For example, a micro-switch may be installed in the outermost starting position of the carriage 90, to automatically stop the motor 41 or to disconnect the power supply when the carriage returns to that position. Furthermore, the sprocket wheels 110 and 112, adapted for driving the crankpin 114, may be easily replaced by suitable gearing or the like.

We claim:

1. An optical record unit comprising, in combination:
a sheet like medium;
an optical sound track formed on one surface of said sheet-like medium, the sound track being adapted to be in face-to-face relationship with a radially slotted turntable for reproducing the sound associated with the sound track;
a second surface of the sheet-like medium adapted to visually display sound track-related information thereon,
a unitary photoelectric reproducing head mounted below the turntable and rotatable therewith, said head scanning said sheet-like medium through said slot; said head comprising a hollow cylindrical housing, a light source adjacent one end of said housing, a lens system within the housing for converging the light radiated by the light source, and a photoelectric element disposed adjacent the other end of the housing, and
means for audibly reproducing the sound formed on said sheet-like medium, said means being in electrical communication with said photoelectric element.

2. An optical recording unit according to claim 1, wherein, the second surface of said sheet-like medium has a plurality of blanks for writing upon.

3. An optical record unit according to claim 1, wherein said optical sound track is formed in multiturn spiral arrangement, and the sheet-like medium is an opaque sheet-like medium.

4. An optical record unit according to claim 1, wherein said optical track is formed in multiturn spiral arrangement, the sheet-like medium is an opaque sheet-like medium, and the second surface thereof has a plurality of blanks for writing upon.

5. A device for reproducing sound intelligence stored in an optical sound track formed in multiturn spiral arrangement on one surface of a sheet-like record medium, comprising, in combination:
a casing;
a turntable on the top surface of said casing on which said sheet-like record medium is to be placed with its optical sound track in register with said turntable;
said turntable having a slot extending radially therethrough;
means for rotating said turntable relative to said sheet-like medium;
a photoelectric reproducing head mounted below said turntable for scanning said optical sound track through said slot;
said photoelectric reproducing head being rotatable with said turntable; and
feed means for linearly moving said photoelectric reproducing head along said slot in relation with the rotation of each turntable, said feed means comprising a carriage supporting said photoelectric reproducing head and slidably mounted on a pair of guide rods secured to the lower surface of said turntable and extending along said slot, a spirally grooved feed rod rotatably mounted on the lower surface of said turntable and extending parallel to said guide rods, transmission means for imparting the rotation of said turntable to said feed rod, and means for converting the rotation of said feed rod into linear motion of said carriage along said guide rods, whereby said photoelectric reproducing head is made capable of following the spiral path of said optical sound track due to the resultant of its own linear motion and the rotation of said turntable.

6. A device according to claim 5, in which said transmission means comprises a first helical gear fixedly mounted below said turntable on the same axis therewith, and a second helical gear fixedly mounted on said feed rod, said first and said second helical gear being intermeshed with each other.

7. A device according to claim 5, in which said means for converting the rotation of said feed rod into linear motion of said carriage comprises a turntable arm extending from said carriage and resiliently urged toward said feed rod, and a member provided to said arm to be slidably received in the spiral groove formed on said feed rod.

8. A device according to claim 7, further comprising automatic return means for automatically returning said photoelectric reproducing head from its terminal position at the inner end of said slot to the starting position at the outer end of said slot.

9. A device according to claim 8, in which said automatic return means comprises cam means for disengaging said carriage from said feed rod by turning said arm when said carriage reaches the inner end of said slot, a return rod extending parallel to said feed rod for moving said carriage back to the outer end of said slot while the same is disengaged from said feed rod, and means for linearly moving said return rod back and forth in relation with the rotation of said turntable.

10. A device according to claim 9, in which the leading end of said return rod is bifurcated to engage a return plate affixed to said arm when said arm is turned by said cam means for disengaging said carriage from said feed rod.

11. A device according to claim 9, in which said means for linearly moving said return rod comprises a first sprocket wheel fixedly mounted below said turntable on the same axis therewith, a second sprocket wheel rotatably mounted on the lower surface of said turntable and linked with said first sprocket wheel by a chain, a crankpin revolvable with said second sprocket wheel, a lever operatively associated with said crankpin, and an oscillatable member for transmitting the motion of said lever to said return rod.

12. A device according to claim 5, further comprising sheet-retaining means for immovably holding said sheet-like record medium in position on the top surface of said casing.

13. A device according to claim 12, in which said sheet-retaining means comprises a plurality of pins projecting upwardly from the top surface of said casing to be inserted into holes formed correspondingly through said sheet-like medium.

14. A device according to claim 5, further comprising a flat cover hingedly connected to one edge of the top surface of said casing to be turned down onto the sheet-like record medium placed in position on said top surface.

15. A device according to claim 14, in which said cover is transparent.

* * * * *